(12) United States Patent
Wang et al.

(10) Patent No.: US 11,520,007 B2
(45) Date of Patent: Dec. 6, 2022

(54) SIX-PORT SELF-INJECTION-LOCKED RADAR

(71) Applicant: NATIONAL SUN YAT-SEN UNIVERSITY, Kaohsiung (TW)

(72) Inventors: Fu-Kang Wang, Kaohsiung (TW); Zhi-Rong Liu, Kaohsiung (TW); Pin-Hsun Juan, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 411 days.

(21) Appl. No.: 16/930,391

(22) Filed: Jul. 16, 2020

(65) Prior Publication Data

US 2021/0356560 A1   Nov. 18, 2021

(30) Foreign Application Priority Data

May 13, 2020   (TW) ................................. 109115937

(51) Int. Cl.
| | |
|---|---|
| *G01S 13/536* | (2006.01) |
| *G01S 13/88* | (2006.01) |
| *G01S 7/40* | (2006.01) |
| *G01S 7/285* | (2006.01) |
| *G01S 13/04* | (2006.01) |

(52) U.S. Cl.
CPC ............ *G01S 7/4052* (2013.01); *G01S 7/285* (2013.01); *G01S 13/04* (2013.01); *G01S 13/536* (2013.01); *G01S 13/88* (2013.01); *G01S 7/4069* (2021.05)

(58) Field of Classification Search
CPC ........ G01S 7/4052; G01S 7/285; G01S 13/04; G01S 13/536; G01S 13/88; G01S 7/4069; G01S 7/03; G01S 7/28
See application file for complete search history.

(56) References Cited

U.S. PATENT DOCUMENTS

| | | | | |
|---|---|---|---|---|
| 10,862,518 B1 * | 12/2020 | Labadie | ................... | H04B 1/18 |
| 11,051,703 B2 * | 7/2021 | Liu | ....................... | A61B 5/0507 |
| 2016/0187475 A1 * | 6/2016 | Horng | ..................... | G01S 13/88 |
| | | | | 342/21 |

(Continued)

FOREIGN PATENT DOCUMENTS

| | | |
|---|---|---|
| CN | 108398680 A | 8/2018 |
| EP | 1600806 A2 | 11/2005 |
| EP | 3298956 A1 | 3/2018 |

(Continued)

OTHER PUBLICATIONS

Taiwanese Office Action dated Nov. 30, 2020 for Taiwanese Patent Application No. 109115937, 3 pages.

*Primary Examiner* — Donald H B Braswell

(74) *Attorney, Agent, or Firm* — Demian K. Jackson; Jackson IPG PLLC

(57) ABSTRACT

A six-port self-injection-locked (SIL) radar includes an oscillation element, an antenna element, a six-port frequency demodulation element and a signal processing element. Because of a coupler and a phase shifter of the six-port frequency demodulation element, the signal processing element can extract vibration information of subject by using only two demodulated signals output from the six-port frequency demodulation element. As a result, the operation frequency of the six-port SIL radar is not limited by hardware architecture, and the hardware costs and the power consumption are also reduced.

12 Claims, 7 Drawing Sheets

(56) References Cited

U.S. PATENT DOCUMENTS

2018/0357474 A1* 12/2018 Horng .................... G06V 40/23
2021/0278499 A1*  9/2021 Chandrasekaran ....... H01P 5/18

FOREIGN PATENT DOCUMENTS

| TW | 201830048 A | 8/2018 |
| TW | 201901181 A | 1/2019 |
| TW | I669913 B | 8/2019 |

* cited by examiner

US 11,520,007 B2

SIX-PORT SELF-INJECTION-LOCKED RADAR

FIELD OF THE INVENTION

This invention generally relates to a self-injection-locked (SIL) radar, and more particularly to a six-port SIL radar.

BACKGROUND OF THE INVENTION

Conventional SIL radar includes a SIL oscillator, an antenna and a frequency demodulator, the antenna is electrically connected to the SIL oscillator in order to receive an oscillation signal output from the SIL oscillator. The antenna transmits the oscillation signal to a subject as a transmitted signal and receives a reflected signal from the subject as a received signal. The movement of the subject relative to the antenna may cause the Doppler Effect in the transmitted signal to allow the reflected signal and the received signal to contain the Doppler phase shift resulted from the movement of the subject. The received signal with the Doppler phase shifts is delivered and injected into the SIL oscillator to shift the oscillation frequency of the SIL oscillator. Hence, the frequency demodulator can receive and demodulate the oscillation signal output from the SIL oscillator to acquire the movement information of the subject.

Generally, a delay line frequency discriminator is used as the frequency demodulator for the conventional SIL radar. Frequency mixing is unavailable in the delay line frequency discriminator when the SIL oscillator is operated in a high frequency, for this reason, operation frequency and sensitivity to tiny vibration is restricted in the conventional SIL radar.

SUMMARY

The object of the present invention is to utilize a six-port frequency demodulation element as a frequency demodulator of a SIL radar such that the operation frequency of the SIL radar is not restricted by the hardware architecture of the general frequency demodulator. Additionally, a coupler and a phase shifter are provided in the SIL radar to allow a signal processing element to extract vibration information of subject by using only two demodulated signals output from the six-port frequency demodulation element. As a result, the required hardware costs of the SIL radar can be reduced.

A six-port SIL radar of the present invention includes an oscillation element, an antenna element, a six-port frequency demodulation element and a signal processing element. The oscillation element is configured to output an oscillation signal. The antenna element coupled to the oscillation element for receiving the oscillation signal is configured to transmit the oscillation signal to a subject as a transmitted signal and receive a reflected signal from the subject as a received signal. The received signal is injected into the oscillation element to allow the oscillation element to operate in a SIL state. The six-port frequency demodulation element includes a coupler, a phase shifter, a delay line and a six-port demodulation circuit. The coupler is coupled to the oscillation element and configured to receive and divide the oscillation signal into a first coupling signal and a second coupling signal. The phase shifter is electrically connected to the coupler and configured to shift a phase of the first or second coupling signal. The delay line is electrically connected to the coupler and configured to delay the second coupling signal. The first coupling signal is delivered to the six-port demodulation circuit as a local oscillation signal, and the second coupling signal is delivered to the six-port demodulation circuit as a radio frequency signal. The six-port demodulation circuit is configured to demodulate the local oscillation signal and the radio frequency signal to output two demodulated signals. The signal processing element includes two power detectors and a processor. The two power detectors are electrically connected to the six-port demodulation circuit for receiving the two demodulated signals and configured to detect the power of the two demodulated signals and then output two power signals. The processor is coupled to the two power detectors for receiving the two power signals and configured to compute a baseband signal of the subject according to the two power signals.

The six-port frequency demodulation element of the present invention is configured as frequency discriminator to allow the six-port SIL radar to be not restricted by hardware architecture, accordingly, the six-port SIL radar is able to be operated at higher frequency and be highly sensitive. Besides, the signal processing element is able to obtain the vibration information of the subject according to demodulated signals of only two paths with the configuration of the coupler and the phase shifter of the six-port frequency demodulation element. This architecture is benefits to reduce the hardware costs and the power consumption of the six-port SIL radar.

DETAILED DESCRIPTION OF THE INVENTION

Figure 1:
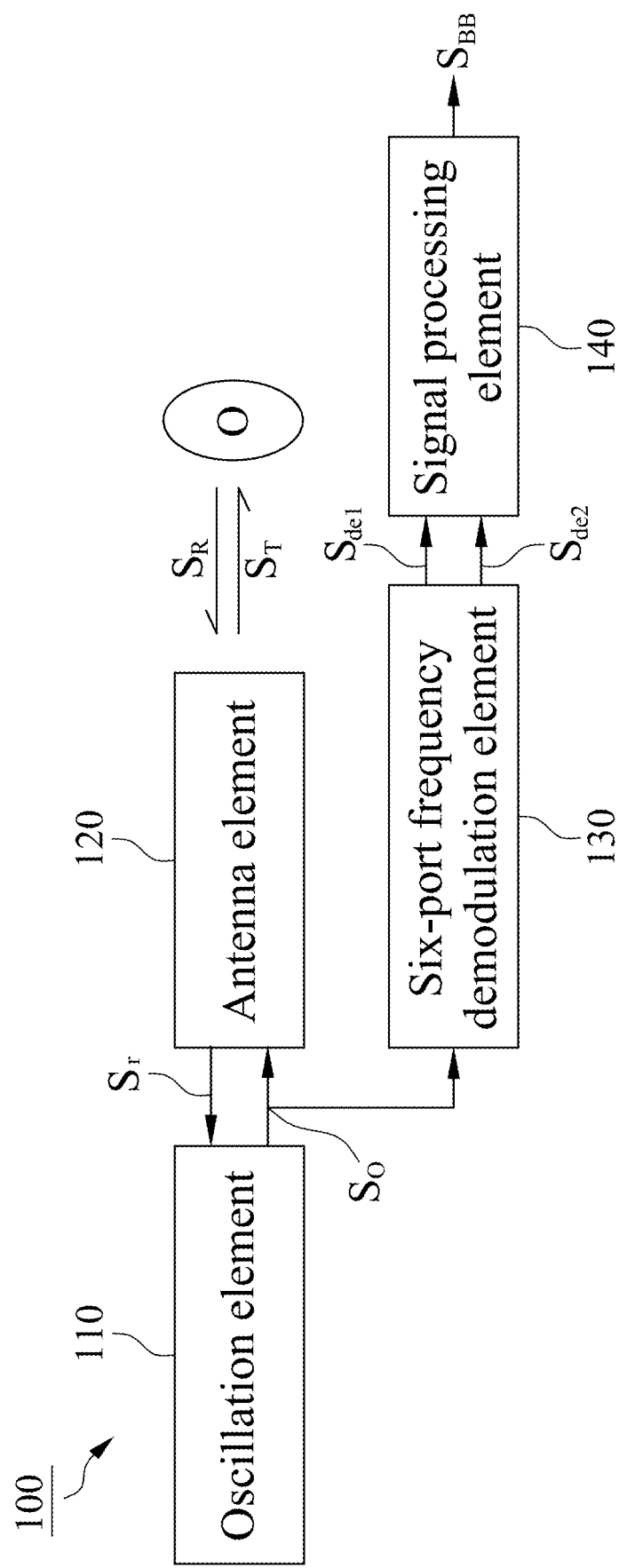
FIG. 1 is a block diagram illustrating a six-port SIL radar in accordance with one embodiment of the present invention.

With reference to FIG. 1, a six-port SIL radar 100 in accordance with one embodiment of the present invention includes an oscillation element 110, an antenna element 120, a six-port frequency demodulation element 130 and a signal processing element 140. The oscillation element 110 outputs an oscillation signal $S_O$, the antenna element 120 is coupled to the oscillation element 110 in order to receive the oscillation signal $S_O$. The antenna element 120 transmits the oscillation signal $S_O$ toward a subject O as a transmitted signal $S_T$ and receives a reflected signal $S_R$ from the subject O as a received signal $S_r$. The received signal $S_r$ received by the antenna element 120 is delivered and injected into the oscillation element 110 to operate the oscillation element 110 in a SIL state. The six-port frequency demodulation element 130, that is coupled to the oscillation element 110 for receiving the oscillation signal $S_O$, demodulates the oscillation signal $S_O$ in frequency and then outputs two demodulated signals $S_{de1}$ and $S_{de2}$. The signal processing element 140 coupled to the six-port frequency demodulation element 130 receives the two demodulated signals $S_{de1}$ and $S_{de2}$ and computes a baseband signal $S_{BB}$ according to the two demodulated signals $S_{de1}$ and $S_{de2}$.

Figure 2:
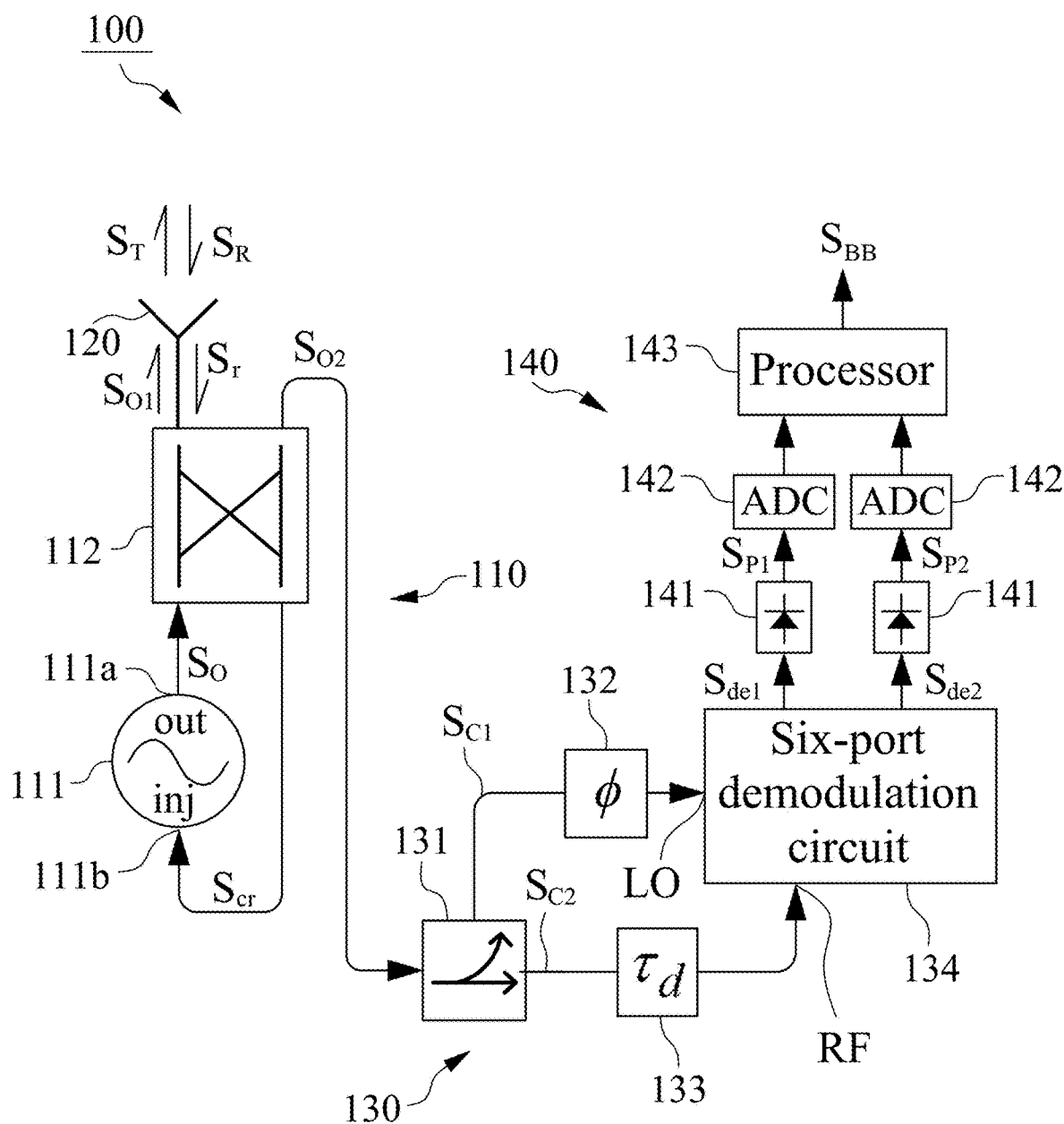
FIG. 2 is a circuit diagram illustrating a six-port SIL radar in accordance with a first embodiment of the present invention.

FIG. 2 represents the six-port SIL radar 100 in accordance with a first embodiment of the present invention. In the first embodiment, the oscillation element 110 includes a SIL oscillator 111 and a coupler 112. The SIL oscillator 111, a voltage-controlled oscillator, is controlled by a voltage (not shown) to output the oscillation signal $S_O$ from its output port 111a. The coupler 112 is a hybrid coupler and electrically connected to the output port 111a of the SIL oscillator 111, the antenna element 120 and the six-port frequency demodulation element 130. The coupler 112 receives the oscillation signal $S_O$ from the output port 111a and couples the oscillation signal $S_O$ into a first coupling oscillation signal $S_{O1}$ and a second coupling oscillation signal $S_{O2}$. The first coupling oscillation signal $S_{O1}$ is delivered to the antenna element 120, and the second coupling oscillation signal $S_{O2}$ is delivered to the six-port frequency demodulation element 130.

With reference to FIG. 2, the antenna element 120 transmits the first coupling oscillation signal $S_{O1}$ to the subject as the transmitted signal $S_T$ and receives the reflected signal $S_R$ from the subject as the received signal $S_r$. The coupler 112 receives the received signal $S_r$ from the antenna element 120 and couples the received signal $S_r$ into a coupling received signal $S_{cr}$. The coupling received signal $S_{cr}$ is delivered and injected into an injection port 111b of the SIL oscillator 111 to allow the SIL oscillator 111 to operate in a SIL state. If the subject is moved or moving relative to the antenna element 120, the reflected signal $S_R$, the received signal $S_r$ and the coupling received signal $S_{cr}$ may all contain Doppler phase shifts caused by the movement of the subject owing to the Doppler Effect in the transmitted signal $S_T$, and the SIL oscillator 111 injection-locked by the coupling received signal $S_{cr}$ may generate frequency shifts on the oscillation signal $S_O$. Accordingly, the six-port frequency demodulation element 130 can frequency-demodulate the oscillation signal $S_O$ output from the SIL oscillator 111 to extract the vibration information of the subject.

With reference to FIG. 2, the six-port frequency demodulation element 130 includes a coupler 131, a phase shifter 132, a delay line 133 and a six-port demodulation circuit 134. In the first embodiment, the coupler 131 is a directional coupler and coupled to the oscillation element 110 via the coupler 112 to receive the second coupling oscillation signal $S_{O2}$. The coupler 131 is used to divide the second coupling oscillation signal $S_{O2}$ into a first coupling signal $S_{C1}$ and a second coupling signal $S_{C2}$. And in the first embodiment, the phase shifter 132 is electrically connected to one port of the coupler 131 so as to shift the phase of the first coupling signal $S_{C1}$, the delay line 133 is electrically connected to the other port of the coupler 131 to delay the second coupling signal $S_{C2}$. The phase-shifted first coupling signal $S_{C1}$ is delivered to the six-port demodulation circuit 134 as a local oscillation signal LO, and the delayed second coupling signal $S_{C2}$ is delivered to the six-port demodulation circuit 134 as a radio frequency signal RF. The six-port demodulation circuit 134 demodulates the local oscillation signal LO and the radio frequency signal RF to output the two demodulated signals $S_{de1}$ and $S_{de2}$.

Through the coupler 131, preferably, the power of the second coupling signal $S_{C2}$ is greater than a power difference of the first coupling signal $S_{C1}$, and the power difference of the first coupling signal $S_{C1}$ is equal to a power attenuation of the delay line 133. Consequently, the local oscillation signal LO and the radio frequency signal RF received by the six-port demodulation circuit 134 have the same amplitude, that is able to prevent too high noise level of one path from covering the Doppler phase shifts of the other path and able to improve the sensitivity of the six-port SIL radar 100. In addition, because the first coupling signal $S_{C1}$ is phase-shifted by the phase shifter 132, the phase of the first coupling signal $S_{C1}$ minus the phase of the second coupling signal $S_{C2}$ is equal to 45±(180×N) or 135±(180×N) degrees, N is a natural number. Also, the phase of the local oscillation signal LO received by the six-port demodulation circuit 134 minus the phase of the radio frequency signal RF received by the six-port demodulation circuit 134 is equal to 45±(180×N) or 135±(180×N) degrees.

Figure 3:
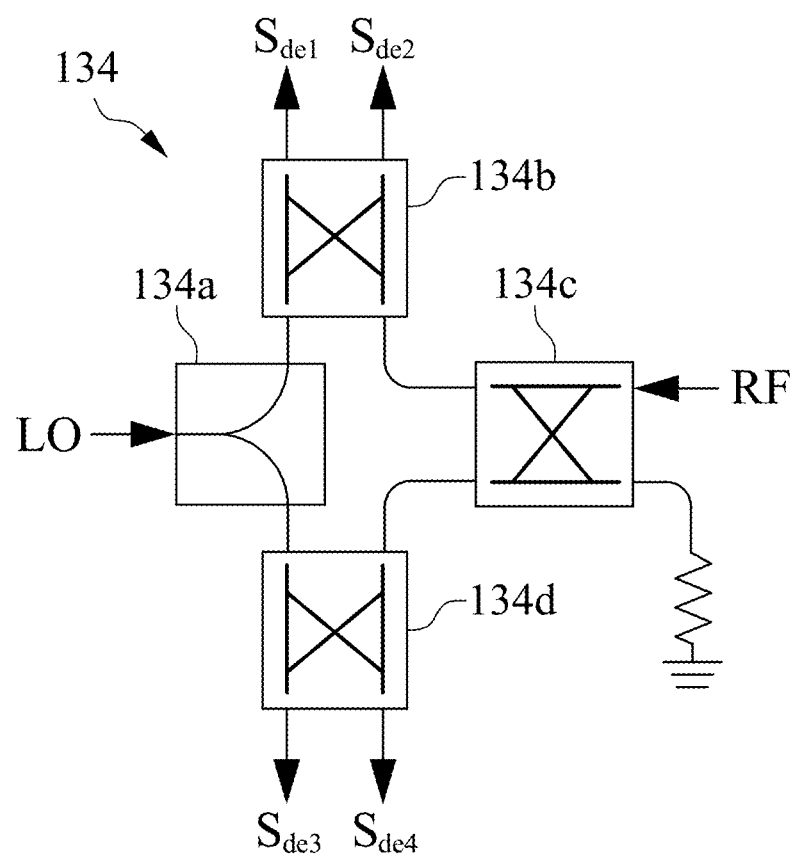
FIG. 3 is a circuit diagram illustrating a six-port demodulation circuit in accordance with the first embodiment.

With reference to FIGS. 2 and 3, the six-port demodulation circuit 134 of the first embodiment is composed of a power splitter 134a and three branch-line couplers 134b, 134c and 134d. The power splitter 134a is electrically connected to the phase shifter 132 so as to receive and divide the local oscillation signal LO into two paths, the local oscillation signal LO of two paths are delivered to the branch-line coupler 134b and the branch-line coupler 134d, respectively. The branch-line coupler 134c is electrically connected to the delay line 133 via one end and electrically connected to a resistor via the other end. The radio frequency signal RF is received and divided into two paths by the branch-line coupler 134c, one path is delivered to the branch-line coupler 134b and the other path is delivered to the branch-line coupler 134d. After the coupling, the branch-line coupler 134b output the demodulated signals $S_{de1}$ and $S_{de2}$, and the branch-line coupler 134d output two demodulated signals $S_{de3}$ and $S_{de4}$.

When the phase of the local oscillation signal LO received by the six-port demodulation circuit 134 minus the phase of the radio frequency signal RF received by the six-port demodulation circuit 134 is equal to 45±(180×N) degrees, back-end circuit can demodulate them to obtain an in-phase signal (I signal) and a quadrature signal (Q signal) carrying the same DC components and opposite AC components. In contrast, when the phase of the local oscillation signal LO received by the six-port demodulation circuit 134 minus the phase of the radio frequency signal RF received by the six-port demodulation circuit 134 is equal to 135±(180×N) degrees, the I signal and the Q signal, that are obtained by the demodulation of the local oscillation signal LO and the radio frequency signal RF, have opposite DC components and identical AC components such that the Q signal can be derived from the I signal. Accordingly, back-end circuit can extract the vibration information of the subject from the demodulated signals $S_{de1}$ and $S_{de2}$ or from the demodulated signals $S_{de3}$ and $S_{de4}$ with the assistance of the phase shifter 132. This architecture can reduce hardware costs and power consumption substantially.

If the demodulated signals $S_{de1}$ and $S_{de2}$ are utilized for further processing in the back-end circuit, the two output ports of the six-port demodulation circuit 134 used to output the demodulated signals $S_{de3}$ and $S_{de4}$ have to be grounded via two resistors (not shown), respectively, to prevent impedance mismatch. Reversely, while the demodulated signals $S_{de3}$ and $S_{de4}$ are selected for further processing in the back-end circuit, the two output ports of the six-port demodulation circuit 134 configured to output the demodulated signals $S_{de1}$ and $S_{de2}$ have to be grounded via the two resistors, respectively, for impedance matching.

With reference to FIG. 2, the signal processing element 140 includes two power detectors 141, two analog-to-digital converters (ADCs) 142 and a processor 143. In the first embodiment, the two power detectors 141 are electrically connected to the six-port demodulation circuit 134 to receive the two demodulated signals $S_{de1}$ and $S_{de2}$ and provided to detect the powers of the two demodulated signals $S_{de1}$ and $S_{de2}$ to output two power signals $S_{P1}$ and $S_{P2}$. The two ADCs 142 are electrically connected to the two power detectors 141, respectively, to convert the two power signals $S_{P1}$ and $S_{P2}$ into digital signals. The processor 143 is electrically connected to the two power detectors 141 for receiving the two converted power signals $S_{P1}$ and $S_{P2}$ and computes the baseband signal $S_{BB}$ of the subject based on the two power signals $S_{P1}$ and $S_{P2}$ to obtain the vibration information. In other embodiments, the baseband signal $S_{BB}$ of the subject can be obtained by using the two demodulated signals $S_{de3}$ and $S_{de4}$.

While the phase of the local oscillation signal LO minus the phase of the radio frequency signal RF leaves $45 \pm (180 \times N)$ degrees, the I signal and the Q signal contain the same DC components and opposite AC components. Through the processor 143, the I signal is obtained by subtraction of the two power signals $S_{P1}$ and $S_{P2}$, and the I signal is filtered to get a DC component and an AC component. The Q signal is obtained by inverting the AC component of the I signal and applying a DC offset to the inverted AC component according to the DC component. Finally, the arctangent demodulation of the I signal and the Q signal is used to get the baseband signal $S_{BB}$ that represents the vibration information of the subject relative to the six-port SIL radar 100.

There are opposite DC components and identical AC components in the I signal and the Q signal when the phase of the local oscillation signal LO minus the phase of the radio frequency signal RF equals to $135 \pm (180 \times N)$ degrees. By using the processor 143, the I signal can be obtained by a subtraction of the two power signals $S_{P1}$ and $S_{P2}$, and the I signal is filtered to get a DC component and an AC component. A DC offset is applied to the AC component of the I signal two times based on the DC component to obtain the Q signal. And also, the baseband signal $S_{BB}$ having the vibration information of the subject relative to the six-port SIL radar 100 can be obtained by the arctangent demodulation of the I signal and the Q signal.

Because of the phase shifter 132 of the six-port frequency demodulation element 130, the phase of the local oscillation signal LO minus that of the radio frequency signal RF can be equal to $45 \pm (180 \times N)$ or $135 \pm (180 \times N)$ degrees in the first embodiment. As a result, the signal processing element 140 only requires the two power detectors 141 and the two ADCs 142 to extract the vibration information of the subject O, this kind of configuration is able to substantially reduce hardware costs and power consumption.

Figure 4:
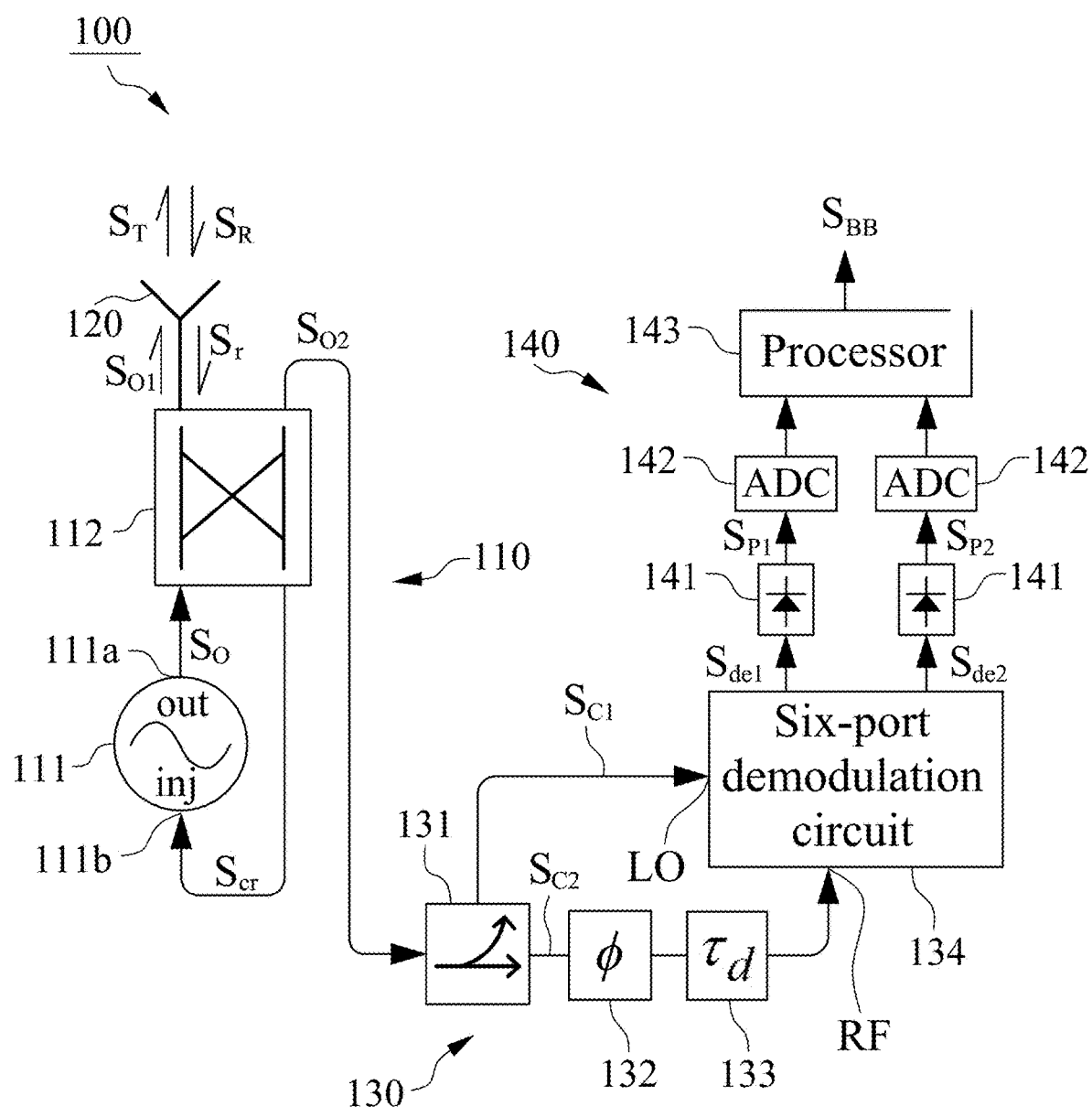
FIG. 4 is circuit diagram illustrating a six-port SIL radar in accordance with a second embodiment of the present invention.

FIG. 4 is a circuit diagram showing the six-port SIL radar 100 of a second embodiment of the present invention. Different to the first embodiment, the phase shifter 132 of the second embodiment is provided to shift the phase of the second coupling signal $S_{C2}$. The phase of the first coupling signal $S_{C1}$ minus the phase of the second coupling signal $S_{C2}$ is equal to $45 \pm (180 \times N)$ or $135 \pm (180 \times N)$ degrees such that the phase of the local oscillation signal LO minus the phase of the radio frequency signal RF is also equal to $45 \pm (180 \times N)$ or $135 \pm (180 \times N)$ degrees. The vibration information of the subject O is also extracted from the only two demodulated signal $S_{de1}$ and $S_{de2}$ by using the signal processing element 140.

Figure 5:
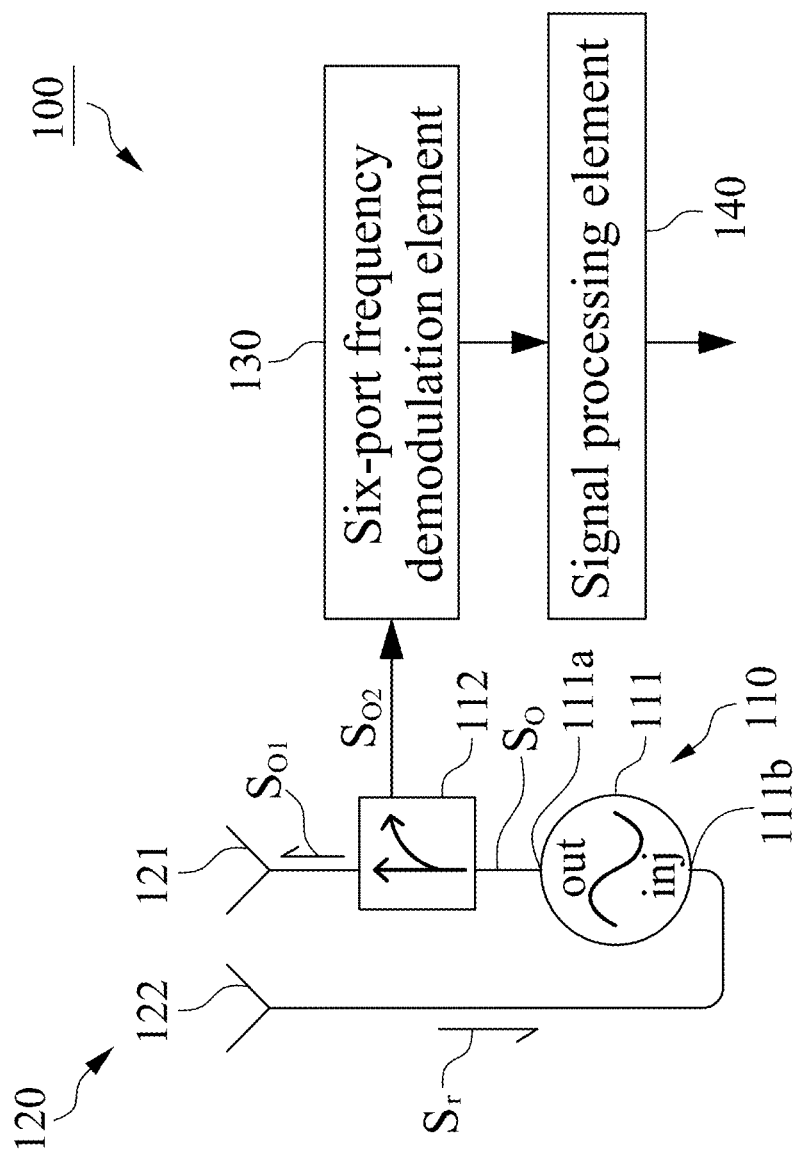
FIG. 5 is a circuit diagram illustrating a six-port SIL radar in accordance with a third embodiment of the present invention.

With reference to FIG. 5, the six-port SIL radar 100 of a third embodiment of the present invention is shown. In the third embodiment, different to the first or second embodiment, the coupler 112 is a directional coupler and the antenna element 120 includes a transmitting antenna 121 and a receiving antenna 122. The SIL oscillator 111 output the oscillation signal $S_O$ from the output port 111a. The coupler 112, that is electrically connected to the SIL oscillator 111, the antenna element 120 and the six-port frequency demodulation element 130, receives the oscillation signal $S_O$ from the SIL oscillator 111. The oscillation signal $S_O$ is coupled into the first coupling oscillation signal $S_{O1}$ and the second coupling oscillation signal $S_{O2}$ by the coupler 112. The first coupling oscillation signal $S_{O1}$ is delivered to the transmitting antenna 121 and the second coupling oscillation signal $S_{O2}$ is delivered to the six-port frequency demodulation element 130. The transmitting antenna 121 transmits the oscillation signal $S_O$ as the transmitted signal $S_T$, the receiving antenna 122 receives the reflected signal $S_R$ as the received signal $S_r$ and injects the received signal $S_r$ into the SIL oscillator 111 via the injection port 111b. The architecture of the third embodiment also allows the SIL oscillator 111 to operate in a SIL state and has high sensitivity to tiny vibration. In the third embodiment, the configurations of the six-port frequency demodulation element 130 and the signal processing element 140 are as same as those of the first or second embodiment.

Figure 6:
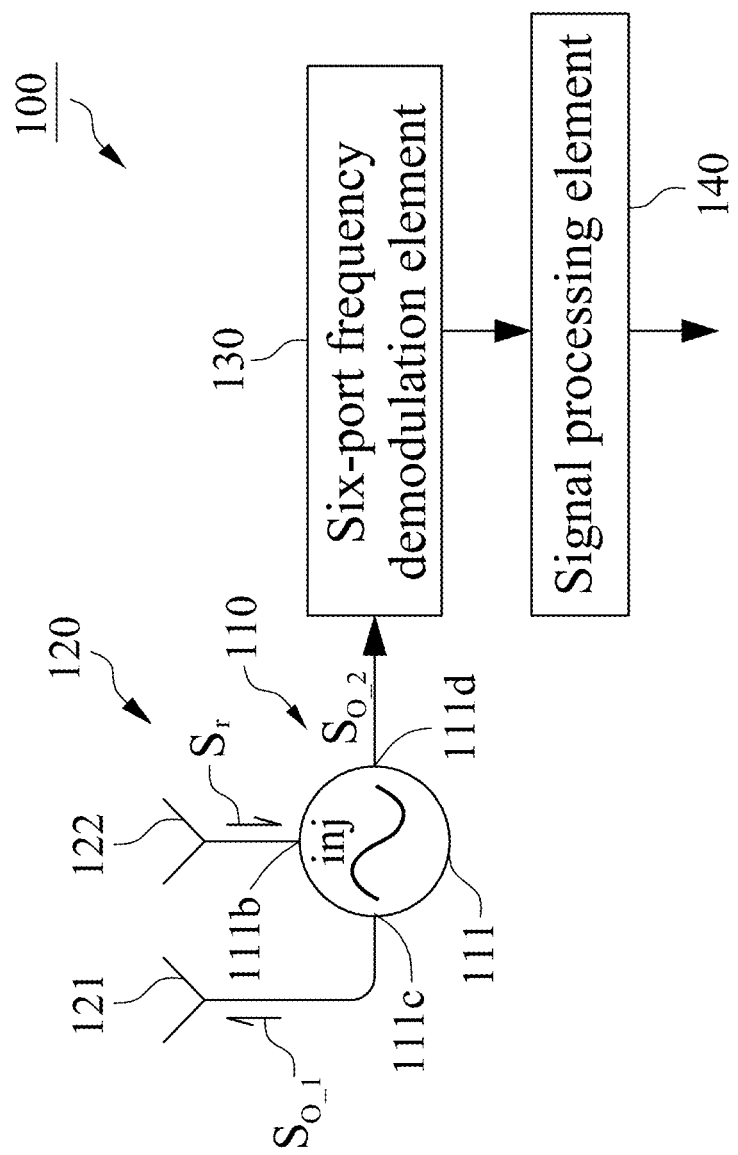
FIG. 6 is a circuit diagram illustrating a six-port SIL radar in accordance with a fourth embodiment of the present invention.

Different to the first or second embodiment, in a fourth embodiment of the present invention as shown in FIG. 6, the antenna element 120 includes a transmitting antenna 121 and the receiving antenna 122, and the SIL oscillator 111 includes a first output port 111c and a second output port 111d. The SIL oscillator 111 outputs a first oscillation signal $S_{O\_1}$ to the transmitting antenna 121 from the first output port 111c, and the transmitting antenna 121 transmits the first oscillation signal $S_{O\_1}$ as the transmitted signal $S_T$. The receiving antenna 122 receives the reflected signal $S_R$ as the received signal $S_r$ and delivers the received signal $S_r$ into the SIL oscillator 111 via the injection port 111b to allow the SIL oscillator 111 to operate in a SIL state. The SIL oscillator 111 output a second oscillation signal $S_{O\_2}$ to the six-port frequency demodulation element 130 from the second output port 111d. The architecture of the fourth embodiment also can make the SIL oscillator 111 to operate in a SIL state and be highly sensitivity to tiny vibration. The configurations of the six-port frequency demodulation element 130 and the signal processing element 140 of the fourth embodiment are as same as those of the first or second embodiment.

Figure 7:
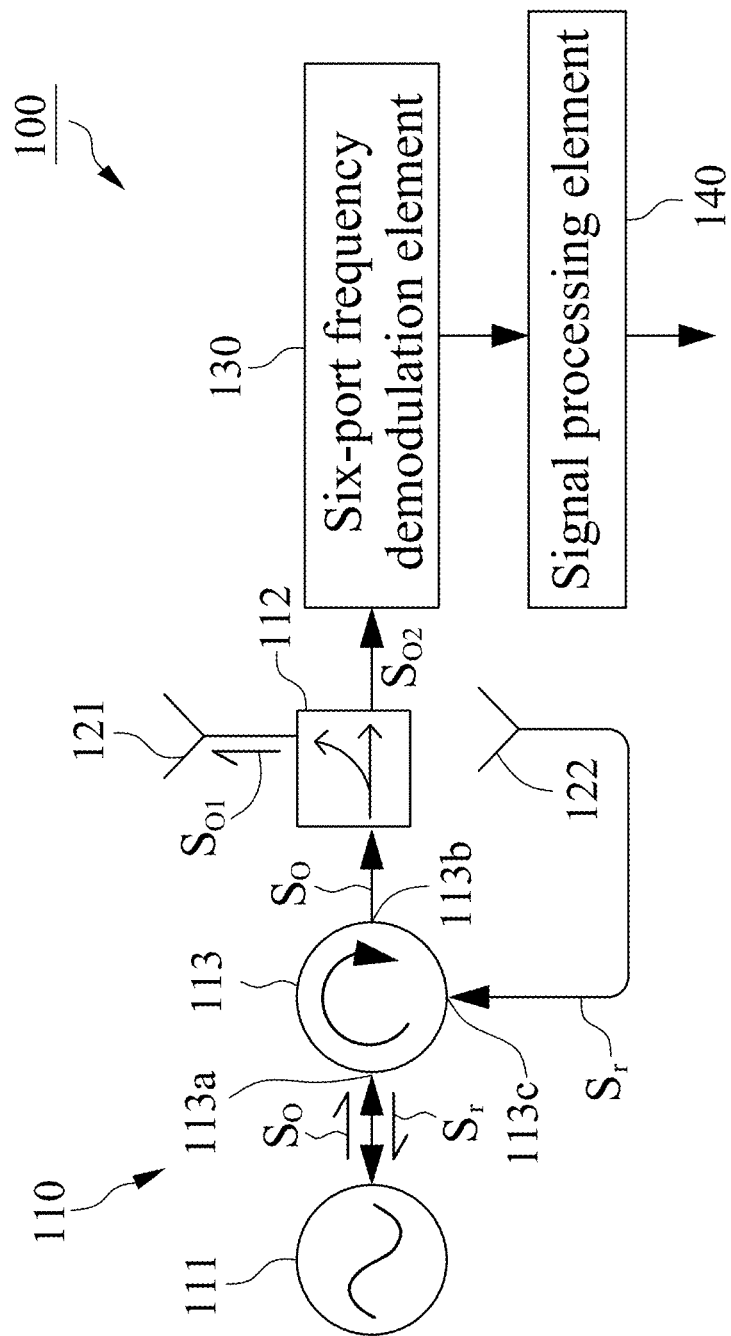
FIG. 7 is a circuit diagram illustrating a six-port SIL radar in accordance with a fifth embodiment of the present invention.

As shown in FIG. 7, the six-port SIL radar 100 of a fifth embodiment of the present invention is different to that of the first or second embodiment. In the fifth embodiment, the oscillation element 110 further includes a circulator 113, the coupler 112 is a directional coupler, and the antenna element 120 includes a transmitting antenna 121 and a receiving antenna 122. The oscillation signal $S_O$ is output from the SIL oscillator 111 to a first port 113a of the circulator 113 and then delivered from a second port 113b of the circulator 113 to the coupler 112. The coupler 112 divides the oscillation signal $S_O$ into the first coupling oscillation signal $S_{O1}$ and the second coupling oscillation signal $S_{O2}$, the first coupling oscillation signal $S_{O1}$ is delivered to the transmitting antenna 121, and the second coupling oscillation signal $S_{O1}$ is delivered to the six-port frequency demodulation element 130. The transmitting antenna 121 transmits the first coupling oscillation signal $S_{O1}$ as the transmitted signal $S_T$, and the receiving antenna 122 receives the reflected signal $S_R$ as the received signal $S_r$. The received signal $S_r$ is delivered to a third port 113c of the circulator 113 and output from the first port 113a of the circulator 113 into the SIL oscillator 111. In the fifth embodiment, the SIL oscillator 111 can also enter a SIL state with high sensitivity to tiny vibration, and the six-port frequency demodulation element 130 and the signal processing element 140 have the same configuration as those of the first or second embodiment.

The six-port frequency demodulation element 130 of the present invention is utilized as frequency discriminator so that the six-port SIL radar 100 is available for higher frequency and sensitivity without restrictions of hardware architecture. And the vibration information of the subject O can be extracted from the demodulated signals of two paths by using the signal processing element 140 result from the coupler 131 and the phase shifter 132 in the six-port frequency demodulation element 130. As a result, the hardware costs and the power consumption of the six-port SIL radar 100 can be reduced.

The scope of the present invention is only limited by the following claims. Any alternation and modification without departing from the scope and spirit of the present invention will become apparent to those skilled in the art.

What is claimed is:

1. A six-port self-injection-locked (SIL) radar, comprising: an oscillation element configured to output an oscillation signal;
    an antenna element coupled to the oscillation element for receiving the oscillation signal, the antenna element is configured to transmit the oscillation signal to a subject as a transmitted signal and receive a reflected signal from the subject as a received signal, the received signal is configured to be injected into the oscillation element to allow the oscillation element to operate in a SIL state;
    a six-port frequency demodulation element including a coupler, a phase shifter, a delay line and a six-port demodulation circuit, the coupler is coupled to the oscillation element and configured to receive and divide the oscillation signal into a first coupling signal and a second coupling signal, the phase shifter is electrically connected to the coupler and configured to shift a phase of the first or second coupling signal, the delay line is electrically connected to the coupler and configured to delay the second coupling signal, the first coupling signal is configured to be delivered to the six-port demodulation circuit as a local oscillation signal and the second coupling signal is configured to be delivered to the six-port demodulation circuit as a radio frequency signal, the six-port demodulation circuit is configured to demodulate the local oscillation signal and the radio frequency signal to output two demodulated signals; and
    a signal processing element including two power detectors and a processor, the two power detectors are electrically connected to the six-port demodulation circuit for receiving the two demodulated signals and configured to detect powers of the two demodulated signals to output two power signals, the processor is coupled to the two power detectors for receiving the two power signals and configured to compute a baseband signal of the subject according to the two power signals.

2. The six-port SIL radar in accordance with claim 1, wherein the oscillation element includes a SIL oscillator and a coupler, the SIL oscillator is configured to output the oscillation signal from a output port, the coupler of the oscillation element is electrically connected to the SIL oscillator, the antenna element and the six-port frequency demodulation element, the coupler of the oscillation element is configured to receive the oscillation signal from the SIL oscillator and couple the oscillation signal into the antenna element and the coupler of the six-port frequency demodulation element, the coupler of the oscillation element is configured to receive the received signal from the antenna element and couple the received signal into the SIL oscillator via an injection port.

3. The six-port SIL radar in accordance with claim 1, wherein the oscillation element incudes a SIL oscillator and a coupler, the antenna element includes a transmitting antenna and a receiving antenna, the SIL oscillator is configured to output the oscillation signal from a output port, the coupler of the oscillation element is electrically connected to the SIL oscillator, the antenna element and the six-port frequency demodulation element, the coupler of the oscillation element is configured to receive the oscillation signal from the SIL oscillator and couple the oscillation signal into the transmitting antenna and the coupler of the six-port frequency demodulation element, the transmitting antenna is configured to transmit the oscillation signal as the transmitted signal and the receiving antenna is configured to receive the reflected signal as the received signal, the received signal is configured to be injected into the SIL oscillator via an injection port.

4. The six-port SIL radar in accordance with claim 1, wherein the antenna element includes a transmitting antenna and a receiving antenna, the SIL oscillator is configured to output a first oscillation signal to the transmitting antenna via a first output port and output a second oscillation signal to the coupler of the six-port frequency demodulation element via a second output port, the transmitting antenna is configured to transmit the first oscillation signal as the transmitted signal, the receiving antenna is configured to receive the reflected signal as the received signal and delivery the received signal to the SIL oscillator via an injection port.

5. The six-port SIL radar in accordance with claim 1, wherein the oscillation element includes a SIL oscillator, a coupler and a circulator, the antenna element includes a transmitting antenna and a receiving antenna, the oscillation signal is configured to be output from the SIL oscillator to a first port of the circulator and output from a second port of the circulator to the coupler of the oscillation element, the coupler of the oscillation element is configured to couple the oscillation signal to the transmitting antenna and the coupler of the six-port frequency demodulation element, the transmitting antenna is configured to transmit the oscillation signal as the transmitted signal and the receiving antenna is configured to receive the reflected signal as the received signal, the received signal is configured to be delivered to a third port of the circulator, be output from the first port of the circulator and be injected into the SIL oscillator.

6. The six-port SIL radar in accordance with claim 1, wherein the phase shifter is configured to shift the phase of the first coupling signal such that the phase of the first coupling signal minus the phase of the second coupling signal equals to $45\pm(180\times N)$ or $135\pm(180\times N)$ degrees, N is a natural number.

7. The six-port SIL radar in accordance with claim 6, wherein the processor is configured to obtain an in-phase signal by subtraction of the two power signals and extract a DC component and an AC component from the in-phase signal when the phase of the first coupling signal minus the phase of the second coupling signal equals to $45\pm(180\times N)$ degrees, the processor is configured to obtain a quadrature signal by inverting the AC component of the in-phase signal and applying a DC offset to the inverted AC component according to the DC component, and the processor is configured to obtain the baseband signal by arctangent demodulation of the in-phase signal and the quadrature signal.

8. The six-port SIL radar in accordance with claim 6, wherein the processor is configured to obtain an in-phase signal by subtraction of the two power signals and extract a DC component and an AC component from the in-phase signal when the phase of the first coupling signal minus the phase of the second coupling signal equals to $135\pm(180\times N)$ degrees, the processor is configured to obtain a quadrature signal by applying a DC offset to the AC component of the in-phase signal two times according to the DC component, and the processor is configured to obtain the baseband signal by arctangent demodulation of the in-phase signal and the quadrature signal.

9. The six-port SIL radar in accordance with claim 1, wherein the phase shifter is configured to shift the phase of the second coupling signal such that the phase of the first coupling signal minus the phase of the second coupling signal equals to $45\pm(180\times N)$ or $135\pm(180\times N)$ degrees, N is a natural number.

10. The six-port SIL radar in accordance with claim 9, wherein the processor is configured to obtain an in-phase signal by subtraction of the two power signals and extract a DC component and an AC component from the in-phase signal when the phase of the first coupling signal minus the phase of the second coupling signal equals to $45\pm(180\times N)$ degrees, the processor is configured to obtain a quadrature signal by inverting the AC component of the in-phase signal and applying a DC offset to the inverted AC component according to the DC component, and the processor is configured to obtain the baseband signal by arctangent demodulation of the in-phase signal and the quadrature signal.

11. The six-port SIL radar in accordance with claim 9, wherein the processor is configured to obtain an in-phase signal by subtraction of the two power signals and extract a DC component and an AC component from the in-phase signal when the phase of the first coupling signal minus the phase of the second coupling signal equals to $135\pm(180\times N)$ degrees, the processor is configured to obtain a quadrature signal by applying a DC offset to the AC component of the in-phase signal two times according to the DC component, and the processor is configured to obtain the baseband signal by arctangent demodulation of the in-phase signal and the quadrature signal.

12. The six-port SIL radar in accordance with claim 1, wherein the signal processing element includes two analog-to-digital converters that are electrically connected to the two power detectors respectively and configured to convert the two power signals into digital signals.

* * * * *